United States Patent
Zhao et al.

(10) Patent No.: US 11,898,701 B2
(45) Date of Patent: Feb. 13, 2024

(54) COMPOSITE PRESSURE VESSEL ASSEMBLY AND METHOD OF MANUFACTURING

(71) Applicant: RTX COPORATION, Farmington, CT (US)

(72) Inventors: Wenping Zhao, Glastonbury, CT (US); Ellen Y. Sun, South Windsor, CT (US); John P. Wesson, West Hartford, CT (US); Paul F. Croteau, Columbia, CT (US); Andrzej Ernest Kuczek, Bristol, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/077,797

(22) Filed: Dec. 8, 2022

(65) Prior Publication Data
US 2023/0108342 A1 Apr. 6, 2023

Related U.S. Application Data

(62) Division of application No. 15/517,025, filed as application No. PCT/US2014/059405 on Oct. 7, 2014, now Pat. No. 11,525,545.

(51) Int. Cl.
*F17C 1/16* (2006.01)
*B29C 63/04* (2006.01)
(Continued)

(52) U.S. Cl.
CPC ............... *F17C 1/16* (2013.01); *B29C 63/04* (2013.01); *B29C 70/305* (2013.01);
(Continued)

(58) Field of Classification Search
CPC ............... F17C 1/16; F17C 2201/0152; F17C 2201/056; F17C 2203/0604;
(Continued)

(56) References Cited

U.S. PATENT DOCUMENTS

| 863,447 A | 8/1907 | Rice |
|---|---|---|
| 1,668,179 A | 5/1928 | Williams |

(Continued)

FOREIGN PATENT DOCUMENTS

| CN | 105874260 A | 8/2016 |
|---|---|---|
| DE | 3026116 A1 | 2/1982 |

(Continued)

OTHER PUBLICATIONS

"Composite Material Technology"; Published Oct. 1991; pp. 225-245.
(Continued)

*Primary Examiner* — Kareen K Thomas
(74) *Attorney, Agent, or Firm* — CANTOR COLBURN LLP

(57) ABSTRACT

A composite pressure vessel assembly includes a plurality of lobes, each of the lobes having at least one interior wall and at least one curved wall, the plurality of lobes being positioned in a side by side arrangement and extending in a longitudinal direction from a first end to a second end. Also included is a plurality of end caps disposed at the ends of the lobes, wherein the plurality of lobes and end caps are formed of at least one fiber-reinforced polymer. A method of manufacturing a composite pressure vessel assembly is provided. The method includes forming a plurality of lobes consisting of at least one fiber-reinforced polymer. The method also includes forming a main body with the plurality of lobes, the lobes disposed in a side by side arrangement.

12 Claims, 7 Drawing Sheets

(51) Int. Cl.
B29C 70/30 (2006.01)
B29L 31/00 (2006.01)

(52) U.S. Cl.
CPC ............. B29L 2031/7156 (2013.01); F17C 2201/0152 (2013.01); F17C 2201/056 (2013.01); F17C 2203/0604 (2013.01); F17C 2203/0614 (2013.01); F17C 2203/0617 (2013.01); F17C 2203/0619 (2013.01); F17C 2203/0636 (2013.01); F17C 2203/0663 (2013.01); F17C 2209/2109 (2013.01); F17C 2209/2154 (2013.01); F17C 2209/225 (2013.01); F17C 2209/227 (2013.01); F17C 2209/232 (2013.01); F17C 2221/012 (2013.01); F17C 2221/031 (2013.01); F17C 2221/033 (2013.01); F17C 2221/035 (2013.01); F17C 2223/0123 (2013.01); F17C 2223/035 (2013.01); F17C 2260/018 (2013.01); F17C 2270/0168 (2013.01); Y02E 60/32 (2013.01)

(58) Field of Classification Search
CPC ...... F17C 2203/0614; F17C 2203/0617; F17C 2203/0619; F17C 2203/0636; F17C 2203/0663; F17C 2209/2109; F17C 2209/2154; F17C 2209/225; F17C 2209/227; F17C 2209/232; F17C 2221/012; F17C 2221/031; F17C 2221/033; F17C 2221/035; F17C 2223/0123; F17C 2223/035; F17C 2260/018; F17C 2270/0168; B29C 63/04; B29C 70/305; B29L 2031/7156; Y02E 60/32

See application file for complete search history.

(56) References Cited

U.S. PATENT DOCUMENTS

| | | | |
|---|---|---|---|
| 2,095,256 A | 10/1937 | Horton | |
| 2,106,494 A | 1/1938 | Debor | |
| 2,341,044 A | 2/1944 | Jackson et al. | |
| 2,726,004 A | 12/1955 | Mcleod | |
| 2,790,489 A | 4/1957 | Denison, Jr. | |
| 3,012,695 A | 12/1961 | Lerner | |
| 3,319,433 A | 5/1967 | Pauliukonis et al. | |
| 4,182,254 A | 1/1980 | Secord | |
| 4,343,409 A | 8/1982 | Silver | |
| 4,374,478 A | 2/1983 | Secord et al. | |
| 4,946,056 A | 8/1990 | Stannard | |
| 5,284,267 A | 2/1994 | Polletta et al. | |
| 5,651,474 A | 7/1997 | Callaghan et al. | |
| 5,787,920 A * | 8/1998 | Krasnov | B60K 15/03006 137/255 |
| 6,095,367 A | 8/2000 | Blair et al. | |
| 6,227,230 B1 | 5/2001 | Huh | |
| 6,257,360 B1 | 7/2001 | Wozniak et al. | |
| 6,412,650 B1 | 7/2002 | Warner | |
| 6,676,163 B2 | 1/2004 | Joitescu et al. | |
| 6,883,536 B2 | 4/2005 | Hiervio et al. | |
| 7,427,000 B2 * | 9/2008 | Austerhoff | B60K 15/03006 220/562 |
| 7,543,667 B2 | 6/2009 | Hwang et al. | |
| 7,624,753 B2 | 12/2009 | Suess et al. | |
| 7,971,740 B2 * | 7/2011 | Shimada | F17C 1/00 220/4.12 |
| 8,020,722 B2 | 9/2011 | Richards et al. | |
| 8,074,826 B2 | 12/2011 | Cronin et al. | |
| 8,235,240 B2 | 8/2012 | Hausberger | |
| 9,174,531 B2 | 11/2015 | Finck | |
| 9,533,569 B2 | 1/2017 | Mckinney | |
| 9,579,969 B2 | 2/2017 | Crist et al. | |
| 2004/0226607 A1 | 11/2004 | Hervio et al. | |
| 2006/0169704 A1 | 8/2006 | Brunnhofer | |
| 2009/0050635 A1 | 2/2009 | Richards et al. | |
| 2014/0166664 A1 | 6/2014 | Lin et al. | |
| 2017/0299119 A1 | 10/2017 | Zhao et al. | |
| 2017/0299122 A1 | 10/2017 | Croteau | |
| 2017/0343160 A1 | 11/2017 | Garosshen et al. | |

FOREIGN PATENT DOCUMENTS

| | | |
|---|---|---|
| EP | 1355105 A2 | 10/2003 |
| EP | 1355107 A2 | 10/2003 |
| EP | 1426673 A2 | 6/2004 |
| EP | 2354700 A1 | 8/2011 |
| FR | 2671542 A1 | 7/1992 |
| FR | 2739912 A1 | 4/1997 |
| WO | 0066940 A1 | 11/2000 |
| WO | 2015069376 A1 | 5/2015 |
| WO | 2016057022 A1 | 4/2016 |
| WO | 2016057023 A1 | 4/2016 |

OTHER PUBLICATIONS

Chinese Office Action Issued in Chinese Application No. 201480082576.5 dated Dec. 30, 2019; 7 Pages.
Chinese Office Action Issued in Chinese Application No. 201480082576.5 dated May 7, 2019; 9 Pages.
International Search Report and Written Opinion Issued in International Application No. PCT/US2014/059398 dated Jun. 23, 2015; 12 Pages.
International Search Report and Written Opinion Issued in International Application No. PCT/US2014/059402 dated Sep. 9, 2015; 15 Pages.
International Search Report and Written Opinion Issued in International Application No. PCT/US2014/059405 dated Jun. 23, 2015; 11 Pages.

* cited by examiner

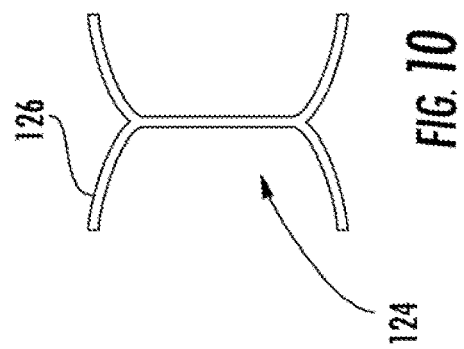
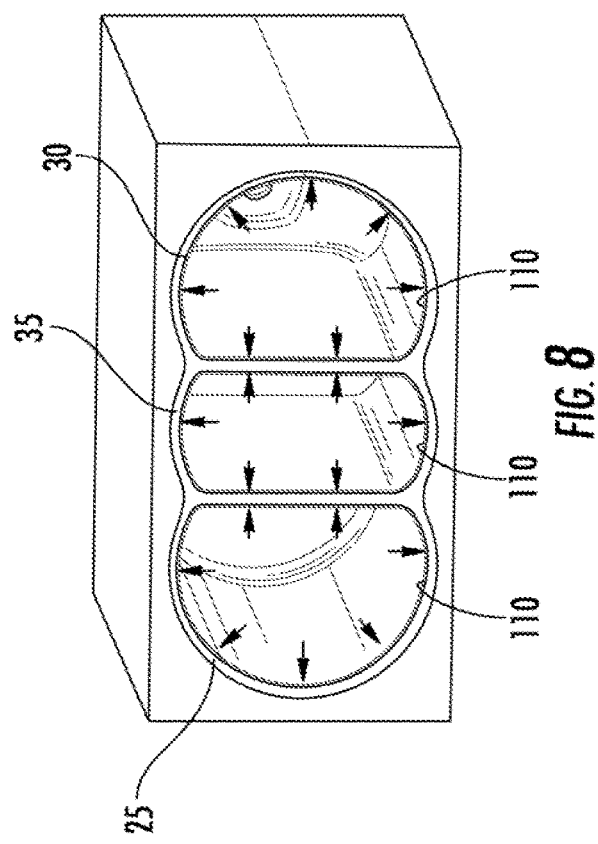
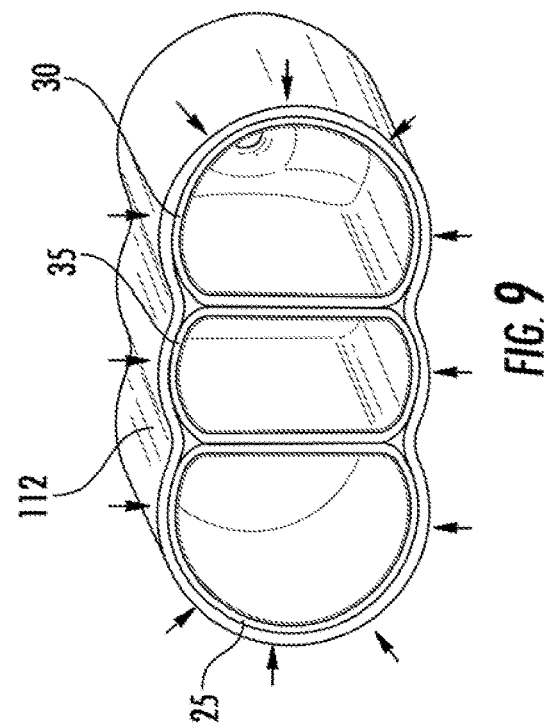

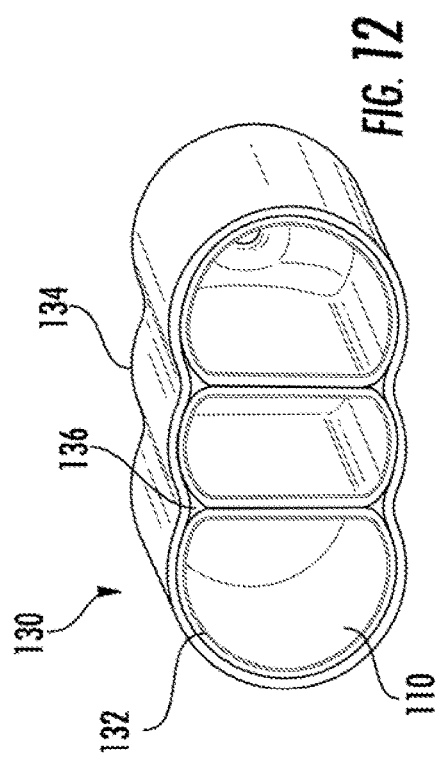
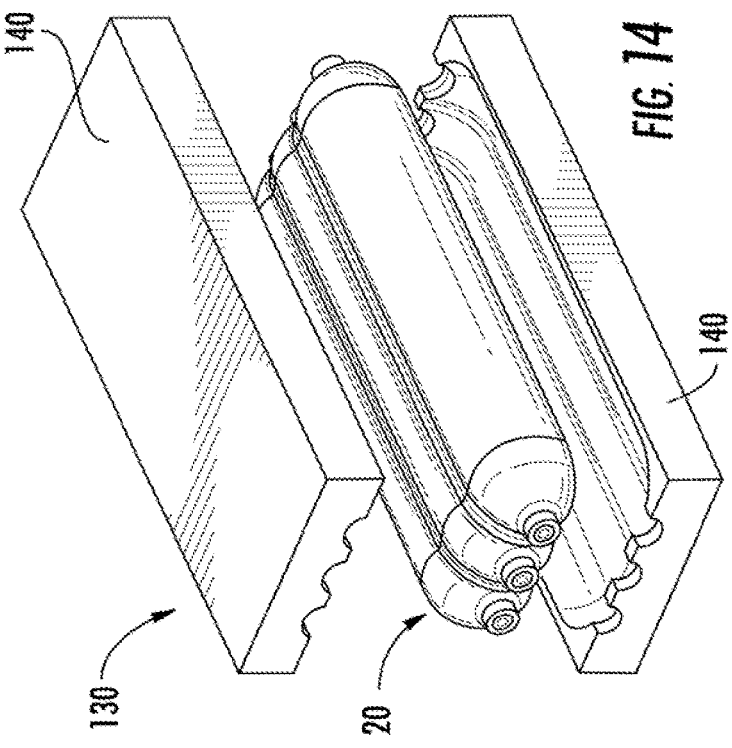
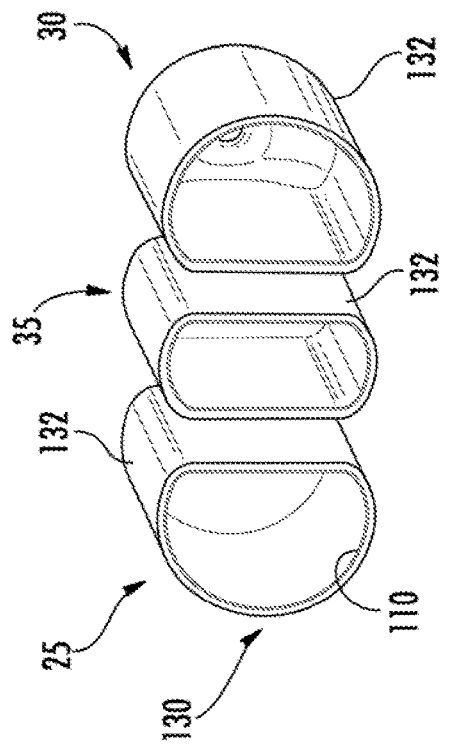
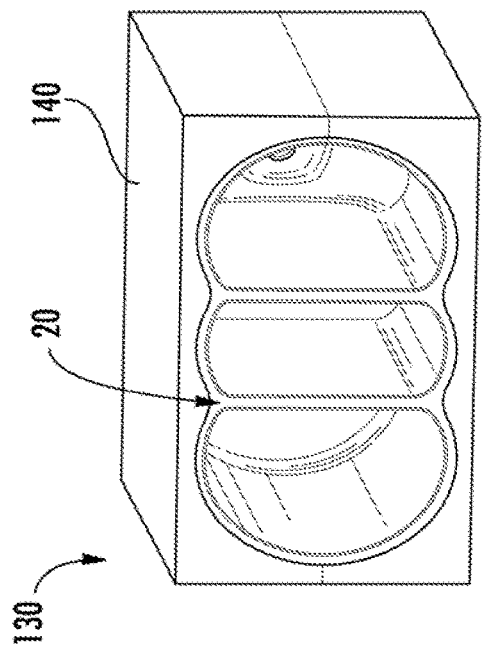

COMPOSITE PRESSURE VESSEL ASSEMBLY AND METHOD OF MANUFACTURING

CROSS-REFERENCE TO RELATED APPLICATIONS

This patent application is a divisional application of U.S. patent application Ser. No. 15/517,025, filed Apr. 5, 2017, which claims the benefit of priority to International Patent Application Serial No. PCT/US2014/059405, filed Oct. 7, 2014, the disclosures of which are incorporated herein by reference in their entirety.

STATEMENT REGARDING FEDERALLY SPONSORED RESEARCH OR DEVELOPMENT

This invention was made with Government support under Agreement DE-AR0000254 for ARPA-E Low Cost Hybrid Materials and Manufacturing for Conformable CNG Tank. The Government has certain rights in the invention.

BACKGROUND OF THE INVENTION

Exemplary embodiments of the invention generally relate to pressure vessel to be used for transport, storage, or utilization of a pressurized fluid, including gas or liquid, and more particularly, to a pressure vessel formed of a composite material, as well as a method of manufacturing such a composite pressure vessel.

Pressure vessels are widely used to store liquids and gases under pressure. The storage capacity of a pressure vessel depends on the internal volume of the pressure vessel and the pressure that the vessel is capable of safely containing. In addition to its storage capacity, the size, internal shape, external shape, and weight of the pressure vessel are customized for a particular application.

One growing application of pressure vessels is the storage of compressed natural gas (CNG). Relatively large cylindrical tanks for the transport or storage of pressurized fluid exist. This basic technology may be extended to enable relatively inexpensive and commercially feasible fabrication of smaller tanks, which are capable of handling fluid under pressure. The current use of industry standard cylinders for CNG in automotive vehicles is limited because the gas volumetric density of a cylinder is low. A tank having enough natural gas to achieve a vehicle driving range comparable to conventional automobiles would be large and bulky and would require space that generally would be otherwise usable cargo space.

The large size and the complicated geometry of a high conformable vessel pose manufacturing challenges. Additionally, manufacturing of metallic materials using forming and welding is a conventional approach, but results in a costly and heavy structure that is susceptible to corrosion over time.

BRIEF DESCRIPTION OF THE INVENTION

According to one embodiment of the invention, a composite pressure vessel assembly includes a plurality of lobes, each of the lobes having at least one interior wall and at least one curved wall, the plurality of lobes being positioned in a side by side arrangement and extending in a longitudinal direction from a first end to a second end. Also included is a plurality of end caps disposed at the ends of the lobes, wherein the plurality of lobes and end caps are formed of at least one fiber-reinforced polymer.

In addition to one or more of the features described above, or as an alternative, further embodiments may include that the plurality of lobes is entirely formed of at least one fiber-reinforced polymer, wherein the composite pressure vessel assembly comprises one of a rectangular or arcuate overall substantial geometry.

In addition to one or more of the features described above, or as an alternative, further embodiments may include that the plurality of lobes and the plurality of end caps are formed as a single, integrally formed composite structure.

In addition to one or more of the features described above, or as an alternative, further embodiments may include that the at least one fiber-reinforced polymer comprises a fiber selected from the group comprising carbon, glass and aramid.

In addition to one or more of the features described above, or as an alternative, further embodiments may include that the at least one fiber-reinforced polymer comprises a polymer matrix comprising at least one of epoxy, vinyl ester, polyester, polyurethane, phenolic, polyamide or polyimide.

According to another embodiment of the invention, a method of manufacturing a composite pressure vessel assembly is provided. The method includes forming a plurality of lobes consisting of at least one fiber-reinforced polymer. The method also includes forming a main body with the plurality of lobes, the lobes disposed in a side by side arrangement.

In addition to one or more of the features described above, or as an alternative, further embodiments may include that the plurality of lobes are formed separately and subsequently joined to each other to form a main body.

In addition to one or more of the features described above, or as an alternative, further embodiments may include that each of the plurality of lobes includes an end cap integrally formed to a first end and an end cap integrally formed to a second end.

In addition to one or more of the features described above, or as an alternative, further embodiments may include that forming the plurality of lobes includes shaping and combining at least one preform, impregnating the preform, and curing the combined preform.

In addition to one or more of the features described above, or as an alternative, further embodiments may include that forming a preform comprises at least one of braiding, weaving, knitting, or a buildup of layered fabrics.

In addition to one or more of the features described above, or as an alternative, further embodiments may include disposing the preform between an external mold and an internal bladder to form the shape of the plurality of lobes.

In addition to one or more of the features described above, or as an alternative, further embodiments may include that each of the plurality of lobes are joined to each other with an adhesive bond.

In addition to one or more of the features described above, or as an alternative, further embodiments may include that each of the plurality of lobes are joined to each other with a preformed connector beam that is positioned between adjacent lobes and bonded to the adjacent lobes.

In addition to one or more of the features described above, or as an alternative, further embodiments may include that the plurality of lobes are integrally formed to form the main body as a single preform.

In addition to one or more of the features described above, or as an alternative, further embodiments may include that the plurality of lobes are integrally formed as a single preform by at least one of braiding, weaving or knitting.

In addition to one or more of the features described above, or as an alternative, further embodiments may include that the plurality of lobes includes a plurality of end caps at each end of the lobes, the method including wrapping a plurality of liners with a short fiber comprising sheet molding compound to form separately wrapped liners. The method also includes disposing the wrapped liners in contact with each other in a desired arrangement. The method further includes wrapping the wrapped liners with an external short fiber comprising sheet molding compound. The method yet further includes applying pressure at internal surfaces of the wrapped liners. The method also includes curing the wrapped liners within an external mold to form a single, integrally formed pressure vessel.

In addition to one or more of the features described above, or as an alternative, further embodiments may include that the plurality of lobes includes a plurality of end caps, the method including shaping a plurality of preforms with at least one of continuous fiber and short fiber, combining the plurality of preforms into a single preform, impregnating the single preform with a resin, and curing the single preform to form a single, integrally formed pressure vessel.

In addition to one or more of the features described above, or as an alternative, further embodiments may include that the plurality of lobes includes a plurality of end caps, the method further comprising spraying a short fiber on a liner to form the preform.

In addition to one or more of the features described above, or as an alternative, further embodiments may include that the plurality of lobes includes a plurality of end caps, the method further including wrapping a plurality of liners with a continuous fiber pre-impregnated composite material to form a single preform. The method also includes curing the single preform within a heated external mold to form a single, integrally formed pressure vessel.

In addition to one or more of the features described above, or as an alternative, further embodiments may include that the plurality of lobes includes a plurality of end caps, the method including wrapping a plurality of liners with a combination of continuous fiber pre-impregnated composite material and a short fiber comprising a sheet molding compound. The method also includes curing the single preform within a heated external mold to form a single, integrally formed pressure vessel.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 8 illustrates an internal pressure distribution according to a method of manufacturing the pressure vessel;

FIG. 9 illustrates an external pressure distribution according to another method of manufacturing the pressure vessel;

FIG. 10 is a composite beam for reinforcing a joint between adjacent lobes of the pressure vessel;

FIG. 11 is a cross-sectional view of the pressure vessel at a first stage of a manufacturing process according to an embodiment;

FIG. 12 is a cross-sectional view of the pressure vessel at a second stage of the manufacturing process of FIG. 11;

FIG. 13 is a cross-sectional view of the pressure vessel at a third stage of the manufacturing process of FIG. 11; and FIG. 14 is a perspective view of the pressure vessel at a fourth stage of the manufacturing process of FIG. 11.

The detailed description explains embodiments of the invention, together with advantages and features, by way of example with reference to the drawings.

DETAILED DESCRIPTION OF THE INVENTION

Figure 1:
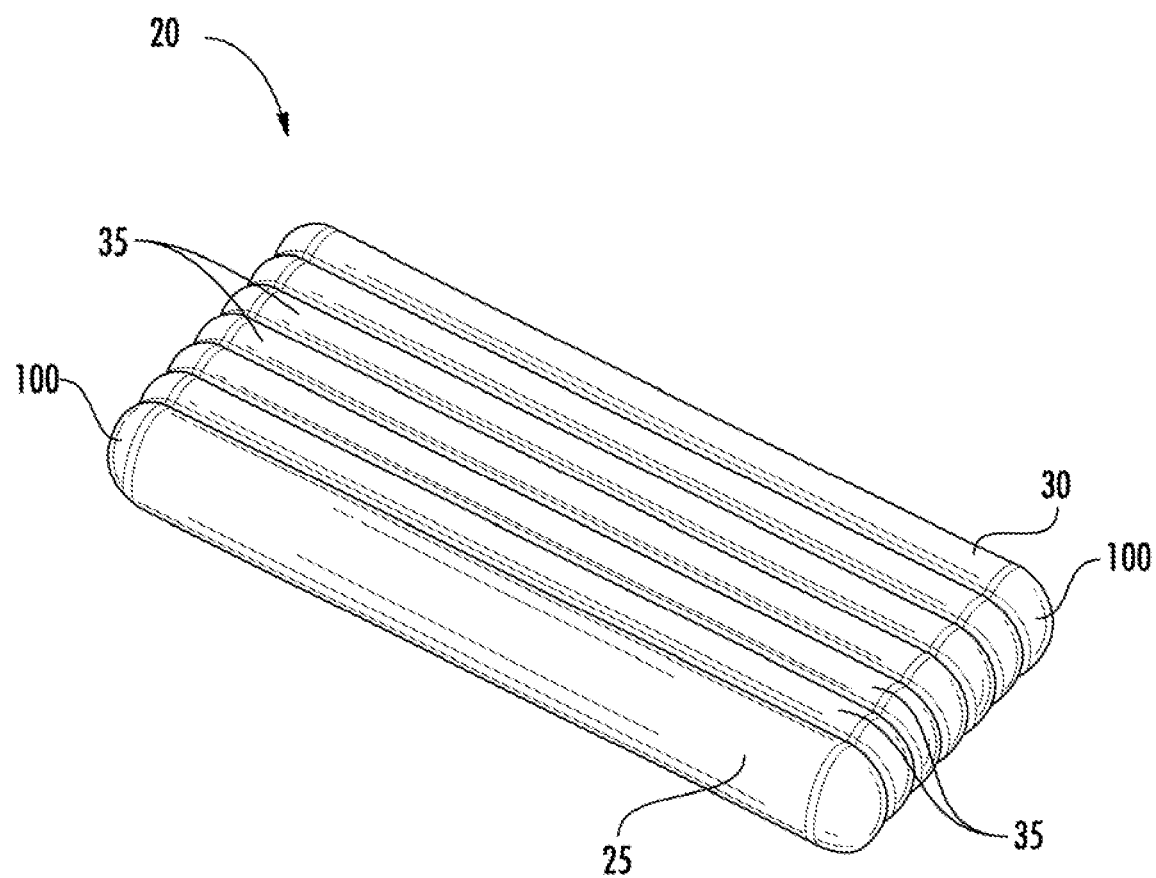
FIG. 1 is a perspective view of a pressure vessel configured to store a pressurized fluid according to an embodiment of the invention.

Referring now to FIG. 1, an example of a pressure vessel or tank 20 configured to store a high pressure fluid is illustrated. Exemplary fluids that may be stored within the pressure vessel 20 include, but are not limited to, compressed natural gas (CNG), hydrogen, propane, methane, air, and hydraulic fluid, for example. The pressure vessel 20 includes a plurality of generally cylindrical lobes including a left end lobe 25 and a right end lobe 30. In the illustrated, non-limiting embodiment, the pressure vessel 20 additionally includes a plurality of substantially identical interior lobes 35, such as five interior lobes 35 for example; however a pressure vessel 20 having any number of interior lobes 35 is within the scope of the invention. The left end lobe 25, one or more interior lobes 35, and the right end lobe 30 are positioned side by side and are joined together by a plurality of bonds (see FIG. 3). As a result of this arrangement, the overall configuration of the pressure vessel 20 is generally rectangular in shape, but as will be appreciated from the description herein, final shapes other than rectangular are contemplated.

Figure 2:
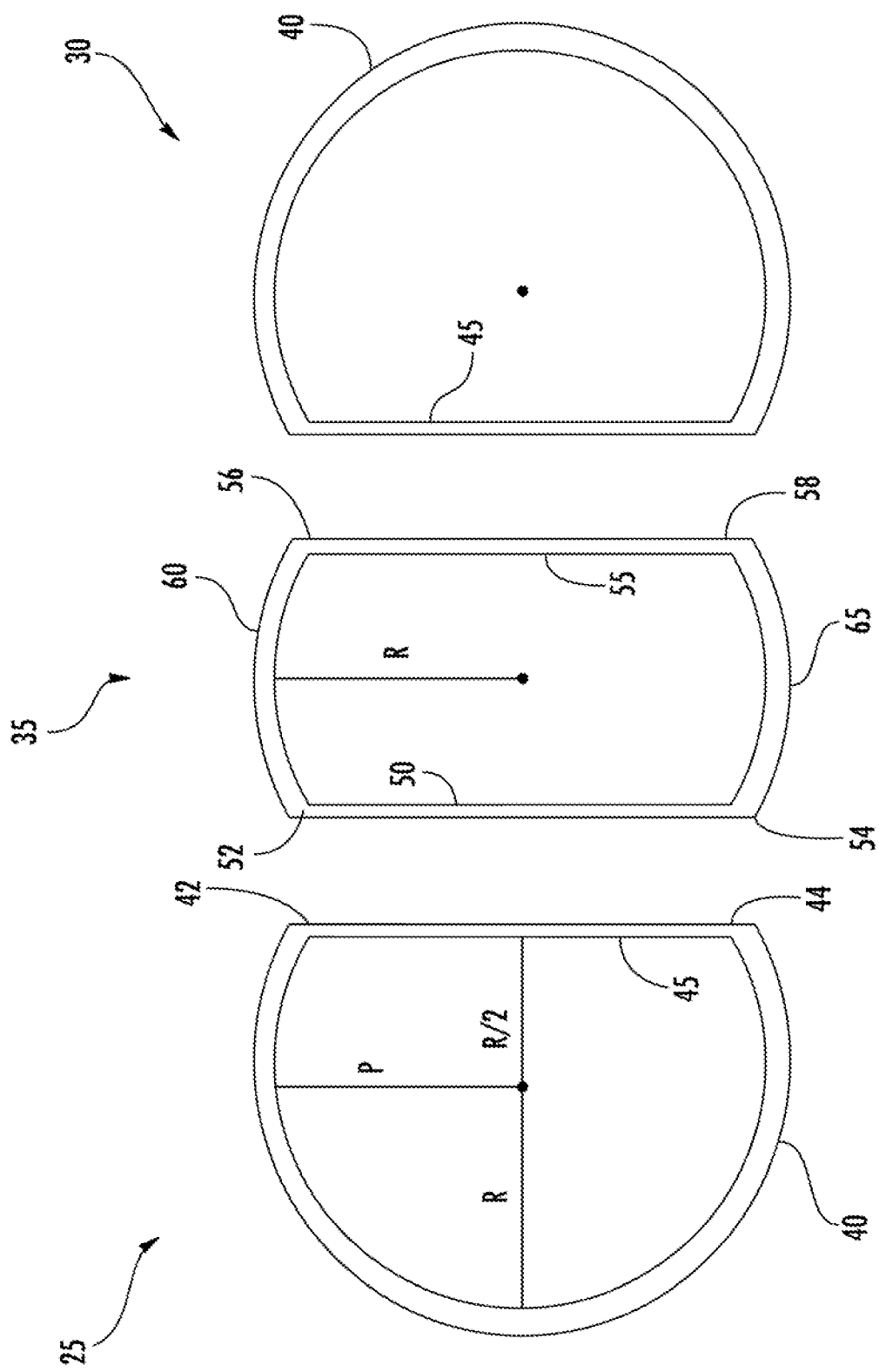
FIG. 2 is a disassembled end view of a portion of an embodiment of the pressure vessel.
Figure 3:
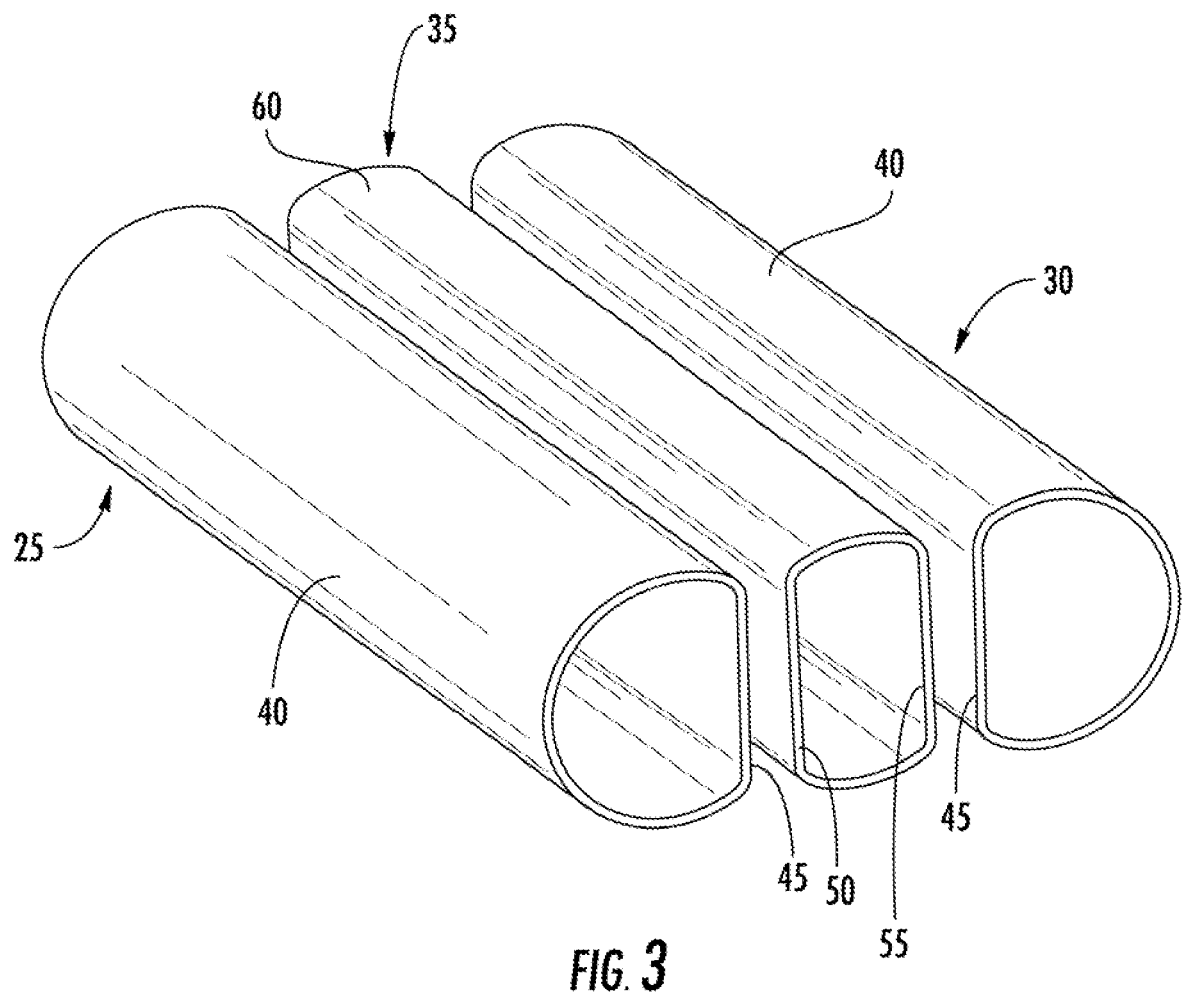
FIG. 3 is a disassembled perspective view of a main body region of the pressure vessel.

Referring now to FIGS. 2 and 3, the individual lobes 25, 30, 35 of the pressure vessel 20 are provided in more detail. The left end lobe 25 and the right end lobe 30 are substantially identical and are arranged such that the right end lobe 30 is rotated 180 degrees relative to the left end lobe 25, or are arranged as a mirror image of one another. The end lobes 25, 30 include a generally cylindrical outer wall 40 having a first thickness. An interior wall 45 extends generally vertically between a first end 42 and a second end 44 of the cylindrical outer wall 40 and has a thickness equal to half that of the outer wall 40. In one embodiment, the interior wall 45 is integrally formed with the ends 42, 44 of the cylindrical outer wall 40. At least a portion of the curvature of the cylindrical outer wall 40 is defined by a radius R. In one embodiment, the portion of the outer wall 40, opposite the interior wall 45, includes a circular shape or curve generally of a 240 degree angle as defined by the radius R. Consequently, the overall height of the end lobes 25, 30 is equal to double the length of the radius R of the cylindrical outer wall 40. The vertical interior wall 45 is generally parallel to and spaced apart from a vertical plane P that includes the origin of the radius R that defines the curvature of the outer wall 40. In one embodiment, the distance between the interior wall 45 and the parallel vertical plane P is about half the length of the radius R. As a result, the end lobes 25, 30 generally have a width equal to about one and a half the length of the radius of curvature R of the outer wall 40.

The illustrated interior lobe 35 includes a vertically arranged first interior sidewall 50 and second interior sidewall 55, separated from one another by a distance. In one embodiment, the width of the interior lobe 35 is generally equal to the radius of curvature R of the end lobes 25, 30. The thicknesses of the first interior sidewall 50 and the second interior sidewall 55 are identical and equal to the thickness of the interior wall 45 of the end lobes 25, 30. A first outside wall 60 extends between a first end 52 of the first interior sidewall 50 and a first end 56 of the second interior sidewall 55. Similarly, a second outside wall 65 extends between a second end 54 of the first interior sidewall 50 and a second end 58 of the second interior sidewall 55. The thickness of the first and second outside walls 60, 65 is substantially identical to the thickness of the curved outer wall 40 of the end lobes 25, 30. In one embodiment, the plurality of interior walls 50, 55 and the plurality of outside walls 60, 65 are integrally formed.

The curvature of the first outside wall 60 and the second outside wall 65 may be defined by a circular shape or curve generally of a 60 degree angle by a radius R. In one embodiment, the radius of curvature R of the interior lobe 35 is substantially identical to the radius of curvature R of the end lobes 25, 30. Consequently, the distance between the first curved wall 60 and the second curved wall 65 is double the length of the radius of curvature R, and is therefore, substantially equal to the height of the end lobes 25, 30.

When the pressure vessel 20 is assembled, each interior wall 45, 50, 55 is positioned directly adjacent another interior wall 45, 50, 55. For example, in a pressure vessel 20 not having any interior lobes 35, the interior wall 45 of the left end lobe 25 is arranged next to the interior wall 45 of the right end lobe 30. In a pressure vessel 20 having a single interior lobe 35, the first interior sidewall 50 abuts the interior wall 45 of the left end lobe 25 and the second interior sidewall 55 abuts the interior wall 45 of the right end lobe 30. In embodiments including a plurality of interior lobes 35, the second interior sidewall 55 of at least one of the interior lobes 35 is arranged next to a first interior sidewall 50 of an adjacent interior lobe 35. The distance between the origin of the radius of curvature R of an interior lobe and the origin of the radius of curvature R an adjacent lobe, either an end lobe 25, 30 or another interior lobe 35, is generally equal to the length of the radius of curvature R. In addition, the overall width of the pressure vessel 20 is generally equal to the sum of three and the total number of interior lobes 35 multiplied by the length of the radius of curvature R.

It is to be appreciated that the above-described geometry is merely an exemplary embodiment of the pressure vessel 20. For example, as an alternative, the interior walls 45, 50, 55 may be angled in contrast to the parallel orientation of the walls of the illustrated embodiment. Such an angled arrangement facilitates a degree of curvature (i.e., arcuate) of the overall pressure vessel 20. As one can appreciate, the embodiments described herein facilitate forming numerous pressure vessel shapes to conform to a variety of storage environments.

As shown in FIGS. 1, 5, 6 and 7, an end cap 100 is joined to, or integrally formed with, the plurality of lobes 25, 30, 35 at both a first end 22 and a second end 24 located opposite the first end 22 of each of the plurality of lobes 25, 30, 35 of the pressure vessel 20. The plurality of end caps 100 joined to an end 22, 24 of each of the lobes 25, 30 35, may be separate from each other or may be integrally formed with each other. Each end cap 100 has a shape substantially complementary to the shape of the adjacent lobe 25, 30, 35 of the pressure vessel 20. In one embodiment, each end cap 100 includes a portion of a sphere having a radius equal to the radius of curvature R. As a result, the end caps 100 of lobes 25, 30 include a greater portion of a sphere than the end cap(s) 100 of interior lobes 35.

The lobes 25, 30, 35 and the end caps 100 of the pressure vessel 20 are at least partially fabricated from at least one composite material. In one embodiment, the entirety of the lobes and end caps are formed of a composite material and are completely integrally formed as a single structure, such that typical joining techniques (e.g., welding, mechanical fastening, etc.) are not required for formation and assembly. The composite material refers to a fiber-reinforced polymer matrix composite. Exemplary matrix materials include epoxy, vinyl ester, polyester, polyamide, polyimide, or similar toughened and nano-enhanced resin systems. Typically, the main reinforcement will be carbon fiber, although other fibers such as glass and aramid fiber may also be employed.

An embodiment of pressure vessel 20 may be fabricated from a composite by a process including, but not limited to, weaving, braiding, knitting, filament winding, ply layups, and an automated tap placement process, for example. These processes may be used individually or in combination to fabricate individual or conjoined tubes and end caps 100 to produce the final geometry. Additional and more specific embodiments of processes which may be employed to form the pressure vessel 20 and subcomponents thereof, as well as joining techniques of the subcomponents, are discussed in detail below.

Figure 7:
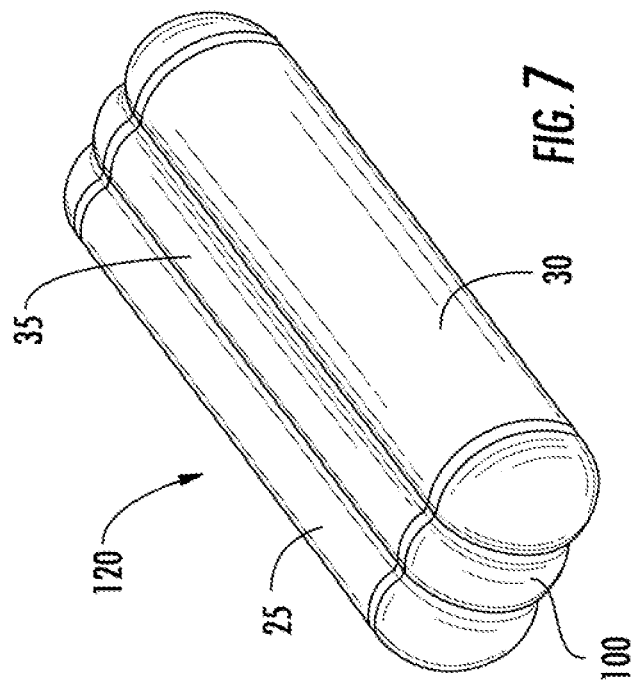
FIG. 7 is a perspective view of the pressure vessel in a final assembly condition.
Figure 6:
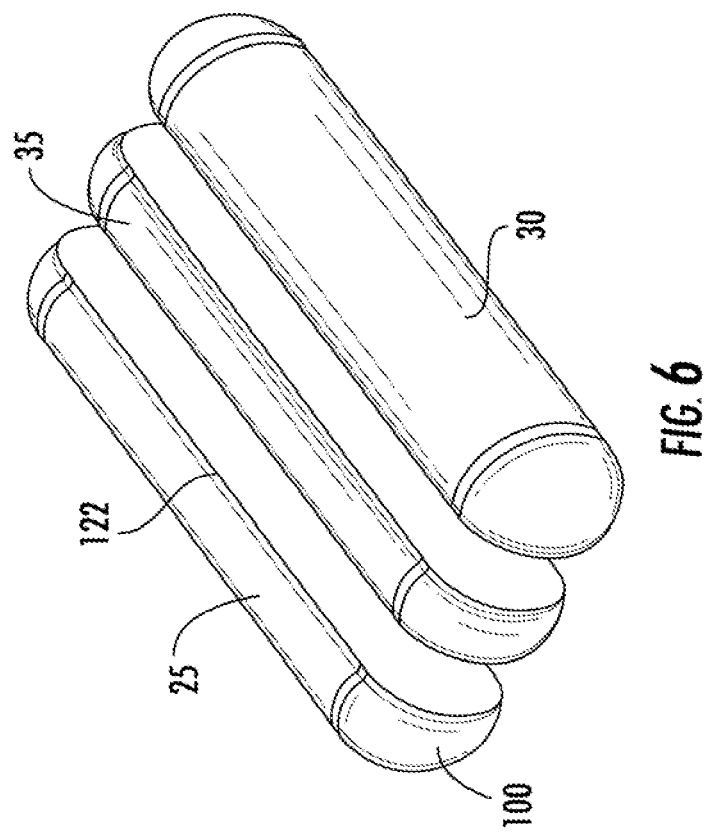
FIG. 6 is a perspective view of the pressure vessel at a stage of manufacturing according to an embodiment of the invention.

Referring to FIGS. 6 and 7, a first method of manufacturing the pressure vessel 20 is illustrated. In the illustrated embodiment, the individual lobes 25, 30, 35 are separately and individually formed. The end caps 100 may be integrally formed with the individual lobes to form entire individual and separate tubes. The individual lobes 25, 30, 35 and end caps 100 are made with any of the above-noted polymer composite forming processes and with any of the aforementioned materials. In some embodiments, the individual lobes are made from fiber preforms with a 3D braiding or 3D weaving/knitting process. The preforms are subsequently impregnated and cured. To enable the preforms to maintain their shape during and subsequent to impregnation and curing, a thin plastic or metallic liner may be enclosed in the braiding, weaving, knitting process (or other suitable process).

Upon formation of the individual lobes 25, 30, 35, the lobes are joined to establish a main body 120 of lobes, which with the integrally formed end caps 100 forms the entire pressure vessel 20. Joining of the lobes 25, 30, 35 may be performed in a number of suitable processes. In one embodiment, the lobes are adhesively bonded together. In combination with the adhesive bonding, additional fiber reinforced composite strips 122 may be included in the joint area to control localized stress. The reinforcement strips 122 can be pre-formed and then bonded in place or formed in-place during the adhesive bonding of the lobes. The reinforcement strips 122 typically extend along an entire length of the lobes, but it is to be appreciated that the strips may be spaced in an intermittent manner.

In another embodiment, the separate lobes may be joined with composite beams 124 (FIG. 10). The composite beams are similar to the shape of an I-beam and may be pre-formed and bonded between the lobes 25, 30, 35. The flange 126 of the beam 124 has some degree of curvature to conform to the shape of the external lobe surface to provide sufficient bonding area and to provide efficient load transfer stress. The edges of the I-beam 124 are generally tapered to prevent stress concentration and peel. The construction of each lobe is designed to optimize load transfer in an integrated design.

Figure 4:
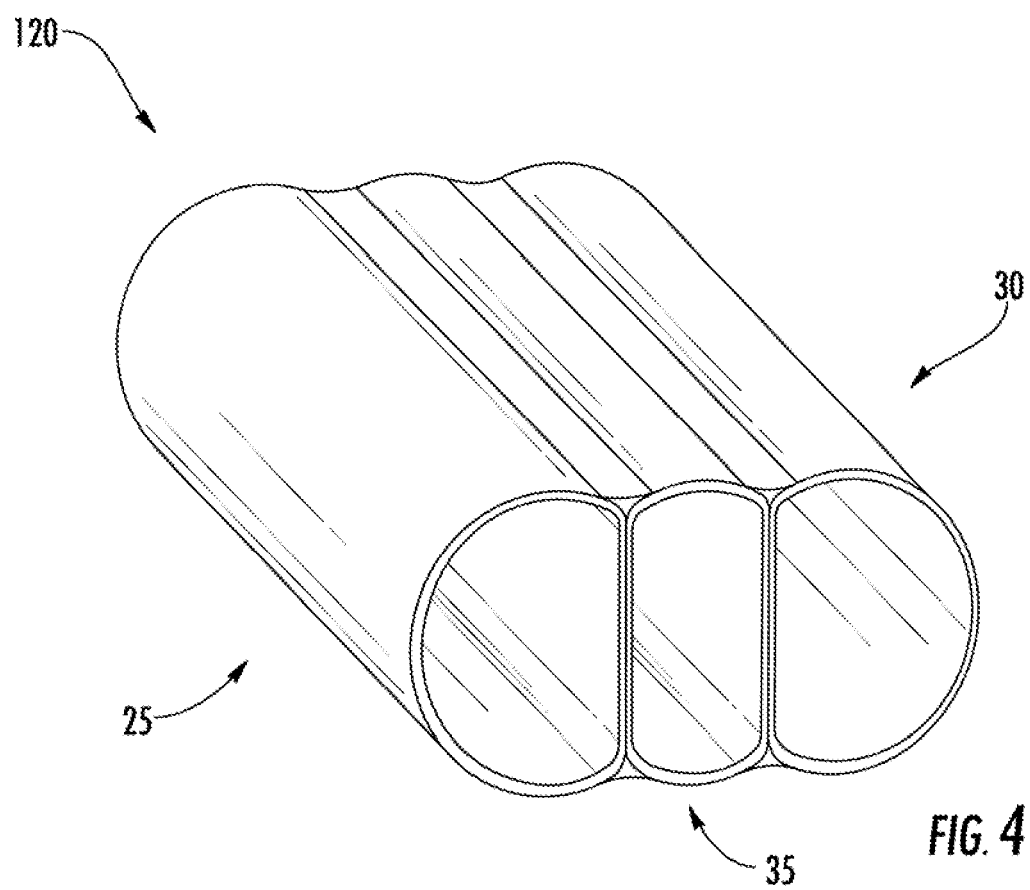
FIG. 4 is a main body of a pressure vessel at a stage of manufacturing according to an embodiment of the invention.
Figure 5:
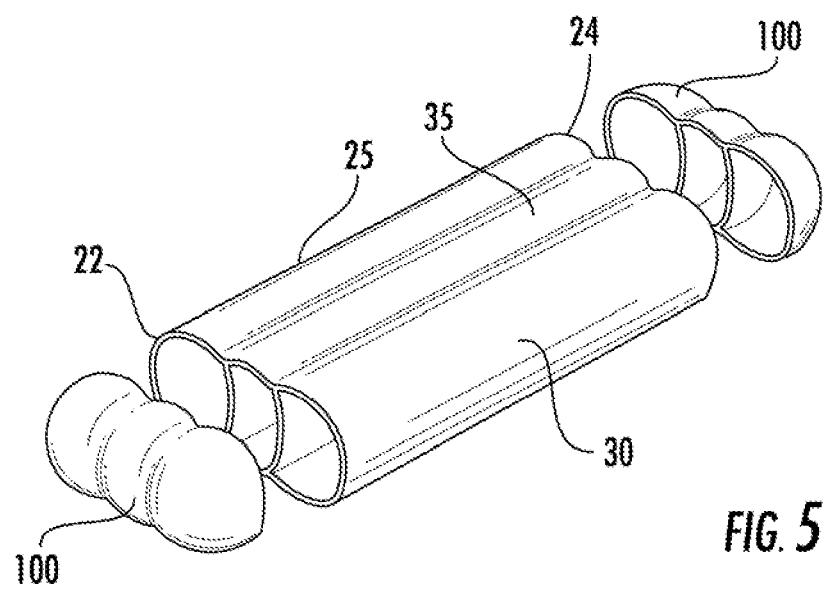
FIG. 5 is a perspective view of the pressure vessel at a stage of manufacturing according to the embodiment of FIG. 4.

Referring now to FIGS. 4 and 5, another embodiment of manufacturing the pressure vessel 20 is illustrated. In the illustrated embodiment, the lobes 25, 30, 35 are integrally formed with each other to form the main body 120. The main body 120 is formed with any of the above-noted polymer composite forming processes and with any of the aforementioned materials. For example, the main body 120 is formed with a single preform that is weaved, braided or knit with integrated yarn, fiber and/or a fabric arrangement. Subsequently, the main body 120 is impregnated and cured as a single tank assembly, with the end caps 100 attached at the ends 22, 24 of the lobes 25, 30, 35. As is the case with the other embodiments described herein, the curing process may include a curing temperature of about 250° F. to about 375° F. The end caps 100 are constructed with another preform and attached with a joint, such as a lap joint that is designed to provide enough load transfer from the lobes to the end caps. Such a manufacturing process integrates the weave or braid pattern of the main tube construction to optimize an efficient load transfer across the connecting regions. A variation of this approach would be to continue the weaving, knitting, or braiding process at one or both of the ends 22, 24 of the lobes with a gradually decreasing radius to make a smaller cross-section, thereby providing a curved, decreasing radius section for attachment of the end caps 100.

Referring to FIG. 8, any of the embodiments described herein may include the use of a liner 110 that facilitates formation of the pressure vessel components. The liner 110 is typically plastic that is wrapped with sheet molding compound (SMC) or sprayed chop fiber/resin. The wrapped liners are assembled with SMC or sprayed chop fiber/resin and additional chopped fiber/resin can be applied to each of the Y-shaped junctions to improve bonding and distribute stress at these positions. The assembly is then placed in a heated mold and pressure is applied from inside of the liner(s) by application compressed air. The liner will deform under pressure and heat is transferred from the mold to compress the composite. The composite cures under heat and pressure to form the final tank.

Alternatively, heat transfer fluid (HTF) may be utilized for applying pressure and temperature from inside the liners. Subsequently, the cured composite is de-molded. The finished part is a fully molded composite tank, with the plastic liner serving as a barrier to prevent gas permeation in gas storage. A thin, flexible metalized film may also be applied to the inner surface of the liner, before or after processing as an enhanced barrier.

Referring now to FIG. 9, additionally, or as an alternative to the internal pressure applied by the liner, an external mold 112 may be used in combination with an internal structure, such as the liner 110 or bladder, to form desired shapes of the lobes 25, 30, 35. In the illustrated embodiment, pressure is applied from outside of the wrapped assembly. In this case, rigid metal liners, rather than plastic liners, would be needed to withstand the pressure and heat during the forming and curing of the composite. A flexible bladder with heat transfer fluid (HTF) may be used for applying the heat, and possibly pressure from outside of the wrapped assembly. Vacuum-bagging the wrapped assembly is an alternative manner in which pressure may be applied.

Referring to FIGS. 11-14, an embodiment of a manufacturing process 130 is illustrated. In the illustrated embodiment, a first stage (FIG. 11) of the manufacturing process shows a liner 110 that may be formed from a plastic material or the like is shaped to a desired geometry, then wrapped with a fiber assembly 132 that is in the form of short fibers comprising sheet molding compound (SMC) or sprayed with chopped fiber and resin. The individual liners 110, which are wrapped individually, are assembled by wrapping additional fiber layer 134 of SMC or sprayed chopped fiber and resin around the outer surface of the individual wrapped liners to form a single structure (FIG. 12). To fill in small substantially Y-shaped gaps, additional chopped fiber/resin 136, referred to as "noodles," may be applied therein to improve bonding and distribute stress at these positions. The assembly may then be placed inside a heated mold 140 (FIG. 13), with pressure being applied internally, externally, or both internally and externally, as described above in detail. Internal pressure may be achieved by injecting a gas, such as compressed air, into the internal region of the lobes. Upon curing of the assembly, the integrally formed composite structure 20 is removed from the mold 140.

Although short fibers are described in detail above, continuous fibers may be employed to form a preform by any of the methods described above, such as braiding, weaving, or knitting, for example. For embodiments using short fibers, as noted above, the short fiber may be sprayed on the liner 110 or may come in as a mat to be formed into a preform.

The pressure vessel 20 has a significantly higher conformability (ratio of volume of pressurized fluid that can be stored within the pressure vessel to the equivalent rectangular envelope) than conventional pressure vessels for storing a pressurized fluid. The high conformability of the pressure vessel 20 is a result of the geometry, which has been optimized to share the loads and minimize the stresses, such as hoop stress for example, on the interior and outer walls 40, 45, 50, 55, 60, 65 of the conjoined lobes 25, 30, 35 under internal pressure. The pressure vessel 20 advantageously is more easily fit within various storage areas, such as vehicles, for example. Additionally, the complete or partial formation of the pressure vessel 20 with a composite advantageously reduces weight when compared to a metallic structure, thereby increasing the energy storage density. A composite pressure vessel also provides greater corrosion resistance in comparison to metallic tanks. Selection of mature and low cost composite material and manufacturing processes beneficially reduces the overall cost of the pressure vessel. The reinforced construction may be optimized to provide more effective load transfer in joined or complex sections, while reducing weight in simple straight or round sections.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of manufacturing a composite pressure vessel assembly comprising:
   forming a plurality of lobes consisting of at least one fiber-reinforced polymer, wherein forming the plurality of lobes comprises:
   shaping and combining at least one preform;
   impregnating the preform; and
   curing the combined preform; and
   forming a main body with the plurality of lobes, the lobes disposed in a side by side arrangement, wherein the plurality of lobes are formed separately and subsequently joined to each other to form the main body.

2. The method of claim 1, wherein each of the plurality of lobes includes an end cap integrally formed to a first end and an end cap integrally formed to a second end.

3. The method of claim 1, wherein forming a preform comprises at least one of braiding, weaving, knitting, or a buildup of layered fabrics.

4. The method of claim 1, further comprising disposing the preform between an external mold and an internal bladder to form the shape of the plurality of lobes.

5. The method of claim 1, wherein each of the plurality of lobes are joined to each other with an adhesive bond.

6. The method of claim 1, wherein each of the plurality of lobes are joined to each other with a preformed connector beam that is positioned between adjacent lobes and bonded to the adjacent lobes.

7. A method of manufacturing a composite pressure vessel assembly comprising:
   forming a plurality of lobes consisting of at least one fiber-reinforced polymer; and
   forming a main body with the plurality of lobes, the lobes disposed in a side by side arrangement, wherein the plurality of lobes are integrally formed to form the main body as a single preform by at least one of braiding, weaving, or knitting.

8. A method of manufacturing a composite pressure vessel assembly comprising:
   forming a plurality of lobes consisting of at least one fiber-reinforced polymer,
   wherein the plurality of lobes includes a plurality of end caps at each end of the lobes, and the forming the plurality of lobes comprises wrapping a plurality of liners with a short fiber comprising sheet molding compound to form separately wrapped liners;
   disposing the wrapped liners in contact with each other in a desired arrangement to form a main body;
   wrapping the wrapped liners with an external short fiber comprising sheet molding compound;
   applying pressure at internal surfaces of the wrapped liners; and
   curing the wrapped liners within an external mold to form a single, integrally formed pressure vessel.

9. A method of manufacturing a composite pressure vessel assembly comprising:
   forming a plurality of lobes consisting of at least one fiber-reinforced polymer, wherein the plurality of lobes includes a plurality of end caps, and the forming the plurality of lobes comprises shaping a plurality of preforms with at least one of continuous fiber and short fiber;
   combining the plurality of preforms in a side by side arrangement into a single preform to form a main body;
   impregnating the single preform with a resin; and
   curing the single preform to form a single, integrally formed pressure vessel.

10. The method of claim 9, further comprising:
    wrapping a plurality of liners with a combination of continuous fiber pre-impregnated composite material and a short fiber comprising a sheet molding compound; and
    curing the single preform within a heated external mold to form a single, integrally formed pressure vessel.

11. The method of claim 9, further comprising spraying a short fiber on a liner to form the preform.

12. A method of manufacturing a composite pressure vessel assembly comprising:
    forming a plurality of lobes consisting of at least one fiber-reinforced polymer, wherein the plurality of lobes includes a plurality of end caps;
    forming a main body with the plurality of lobes, the lobes disposed in a side by side arrangement;
    wrapping the plurality of lobes with a continuous fiber pre-impregnated composite material to form a single preform; and
    curing the single preform within a heated external mold to form a single, integrally formed pressure vessel.

* * * * *